(12) United States Patent
Saito et al.

(10) Patent No.: US 6,613,459 B1
(45) Date of Patent: Sep. 2, 2003

(54) MASTER MAGNETIC INFORMATION CARRIER, FABRICATION METHOD THEREOF, AND A METHOD FOR MANUFACTURING A MAGNETIC RECORDING MEDIUM

(75) Inventors: Akira Saito, Kanagawa (JP); Kazuo Nimura, Nagano (JP); Akihiro Otsuki, Nagano (JP)

(73) Assignee: Fuji Electric Co., Ltd. (JP)

(*) Notice: Subject to any disclaimer, the term of this patent is extended or adjusted under 35 U.S.C. 154(b) by 239 days.

(21) Appl. No.: 09/617,357

(22) Filed: Jul. 17, 2000

(30) Foreign Application Priority Data

Jul. 16, 1999 (JP) .............................. 11-203697

(51) Int. Cl.[7] ..................... B32B 32/20; B32B 15/04; G11B 5/855; G11B 5/012; G11B 5/62
(52) U.S. Cl. .................. 428/692; 428/694 ST; 428/694 SL; 428/694 SG; 427/127; 427/128; 427/130; 427/131; 427/132
(58) Field of Search ................... 428/156, 409, 428/692, 694 T, 694 TR, 694 ST, 694 SG, 694 SL, 457, 472; 360/16, 17, 135, 131; 425/385; 369/280; 427/170, 127, 128, 130, 131, 132

(56) References Cited

U.S. PATENT DOCUMENTS 4,363,844 A * 12/1982 Lewis et al. .................. 428/65
5,637,373 A * 6/1997 Hayashi ...................... 428/65.3
5,677,051 A * 10/1997 Ueda et al. .................. 428/336
5,703,733 A * 12/1997 Suzuki et al. ............. 360/77.01
5,768,075 A * 6/1998 Bar-Gadda .................. 360/135
6,347,016 B1 * 2/2002 Ishida et al. .................. 360/17
6,433,944 B1 * 8/2002 Nagao et al. .................. 360/16

FOREIGN PATENT DOCUMENTS

EP         WO98/03972    *  1/1998
JP         10-40544          2/1998
JP         11-25455          1/1999

* cited by examiner

Primary Examiner—Paul Thibodeau
Assistant Examiner—Nikolas J Uhlir
(74) Attorney, Agent, or Firm—Rossi & Associates (57) ABSTRACT

A master magnetic information carrier has embedded magnetic films that are free from protrusion and recess. The master disk is fabricated by the steps of laminating Co-based soft magnetic film on a resin base plate, forming isolated magnetic films in predetermined region by patterning the magnetic film, pressing a die from above the isolated magnetic films while heating the base plate with the magnetic films thereon, and releasing the die. Since the master disk is a mold product fabricated by pressing the die, the embedded magnetic films and the resin surface portion surrounding the magnetic films are intimately adjoined and protrusions and recesses at the boundary between them are suppressed to a minimum. The surface of the master disk is so smooth and flat that generation of flaws and gouges on the magnetic recording medium and transfer of particles and chemical contaminants to the recording medium in the contact duplication process are reduced.

18 Claims, 8 Drawing Sheets

MASTER MAGNETIC INFORMATION CARRIER, FABRICATION METHOD THEREOF, AND A METHOD FOR MANUFACTURING A MAGNETIC RECORDING MEDIUM

FIELD OF THE INVENTION

The present invention relates to a master magnetic information carrier such as a master disk used in preformatted recording of servo signals, address signals or regenerative clock signals of a magnetic recording medium, in particular, relates to a master magnetic information carrier having embedded magnetic layers that records the servo signals and the like, and a fabrication method thereof. The invention also relates to a magnetic contact duplication technology in a manufacturing process of a magnetic recording medium.

BACKGROUND ART

In a hard disk drive (hereinafter referred to as HDD), for example, recording and reproduction (or writing and reading) of data are processed while a magnetic head flies over a surface of a rotating magnetic recording disk by a floating mechanism called slider holding a flying height of several tens of nm. The bit information on the magnetic recording disk is stored in concentric data tracks on the disk. Read/write of the data is conducted by quickly moving and positioning the read/write head to the target data trace Each of concentric circles on the magnetic recording disk has preformatted fields recording in a certain angular interval the preformatted information including tracking servo signal for detecting relative position between the head and the data track, address signal or generative clock signal, and the data recording and reproducing head automatically detect its own position in a certain time interval. The preformatted information is written on the magnetic recording disk using a special writing apparatus called servo track writer after the disk is installed in a HDD, so that for the center of the writing signal of the preformatted information should not be off-centered from the disk center or the center of the head orbit.

In the meantime, recording density of the magnetic recording disk has currently reached as high as 20 Gbit/in$^2$ in the development phase, and the recording capacity is increasing at a rate of 60% a year. Consequently, the density of the preformatted information for detecting the position of the head has necessarily increased. The prolonged time for writing the preformatted information is becoming a severe factor that lowers productivity of the HDD and raising its cost.

Recently, a preformatting recording technology has been proposed where whole of the preformatted information is transcribed at the same time in a areal manner by means of magnetic contact duplication technique utilizing a master disk, instead of linearly writing along each track utilizing a signal-writing head of the servo track writer. This technology is expected to shorten the preformatting time.

Figure 10A:
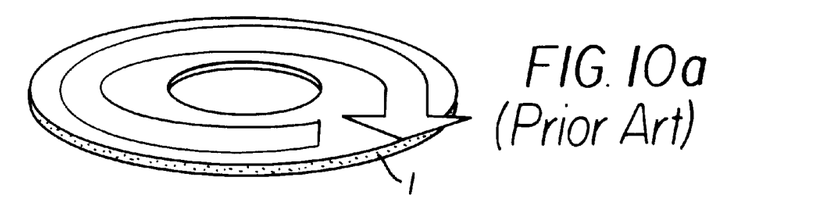
FIG. 10(a) through FIG. 10(c) are perspective views illustrating a preformatting process of a magnetic recording disk.
Figure 10B:
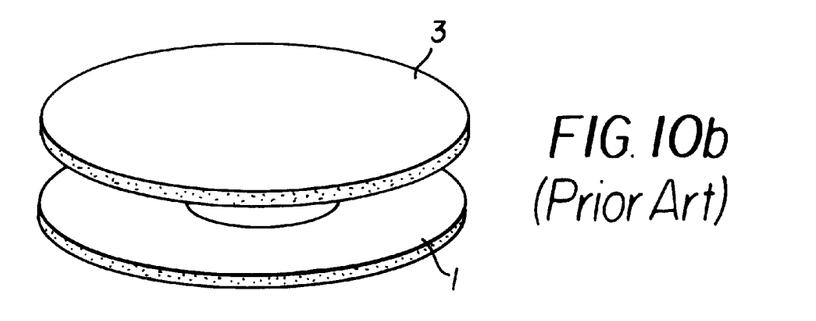
Figure 10C:
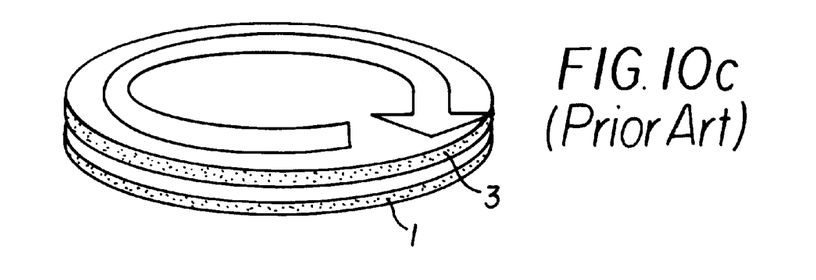
Figure 11A:
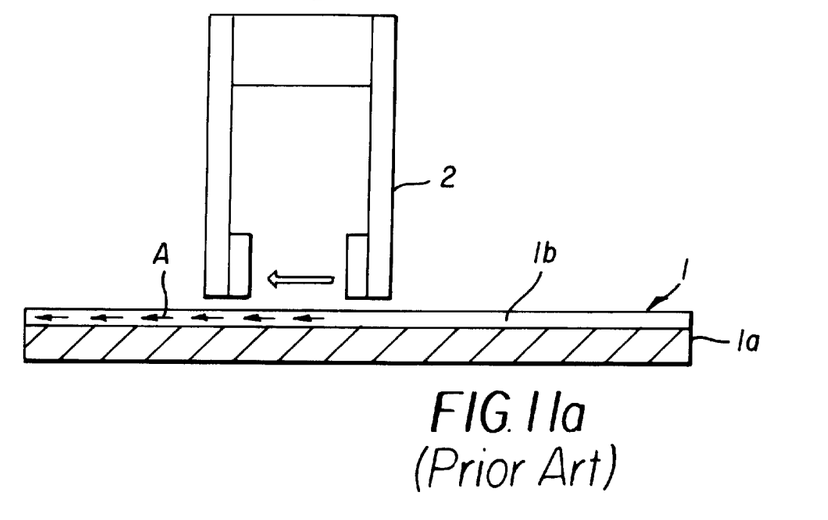
FIG. 11(a) and FIG. 11(b) are cross sectional views illustrating a preformatting process of a magnetic recording disk.

FIG. 10(a) through FIG. 10(c) and FIG. 11(a) and FIG. 11(b) illustrate the magnetic contact duplication technique. FIG. 11(a) is a cross sectional view showing an initial demagnetization process where permanent magnet 2 is moved in a circumferential direction above the surface of the magnetic recording disk 1. Since the structure of the magnetic recording disk 1 is well known, the figure simply shows a substrate 1a and a magnetic layer 1b laminated thereon. The magnetic layer 1b is not magnetized in one direction in the beginning, and is magnetized in the initial magnetization step uniformly in one direction, a circumferential direction, by leakage flux of the permanent magnet 2. The arrows in the magnetic layer 1b represent the direction of demagnetization field A. The curved arrow in FIG. 10(a) shows the moving path of the permanent magnet 2.

Figure 11B:
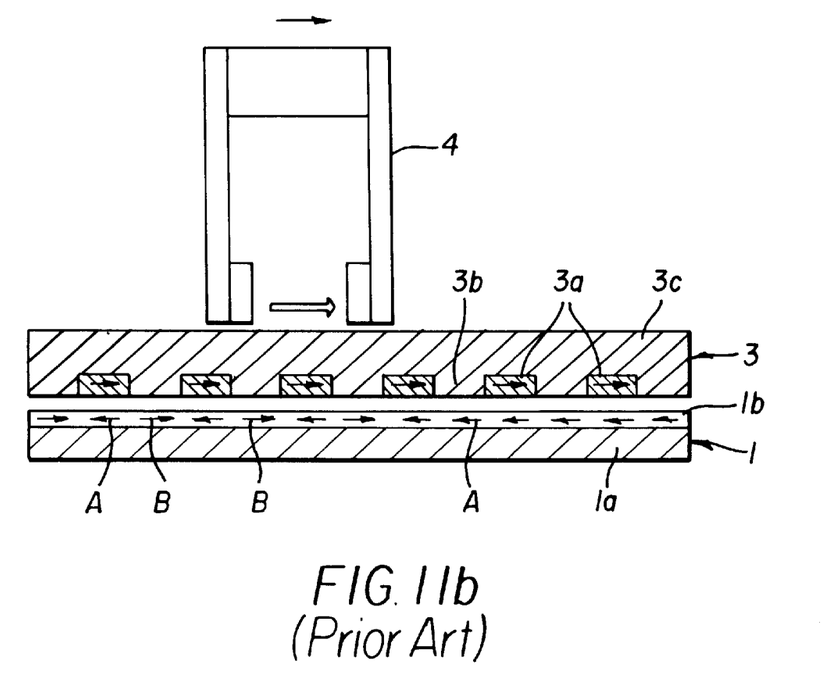

Then, a master disk for magnetic contact duplication is disposed in position on the magnetic recording disk 1 to which initial demagnetization has been performed, as shown in FIG. 10(b) and FIG. 1(b). Embedded magnetic films 3a, which are Co-based soft-magnetic films, are discretely embedded in surface region of the master disk 3, surrounded by surface portion 3b of the substrate.

Magnetic contact duplication is performed by moving the permanent magnet 4 on the master disk 3, as shown in FIG. 10(c) and FIG. 11(b). The curved arrow in FIG. 10(c) indicates the moving path of the permanent magnet 4. The magnetic field in the duplication step is the leakage flux from the permanent magnet 4, the direction of which is reversed from the demagnetization field A. During the movement of the permanent magnet 4, the leakage flux pass through the surface portion 3b of the substrate and reach the magnetic layer 1b of the magnetic recording disk 1 and reverse the field direction of the demagnetization A to produce recording magnetization B with high coercive force. In the embedded magnetic film 3a, in contrast, the leakage flux passes along the surface direction of the magnetic film so that magnetic resistance of the magnetic path is minimized. Since the leakage flux does not reach the magnetic layer 1b of the magnetic recording disk 1, the demagnetization A remains, thus a negative pattern of the pattern of the embedded magnetic film 3a is magnetically transferred onto the magnetic recording disk 1. In this magnetic contact duplication technique, the magnetic recording disk is not magnetized by leakage flux of the embedded magnetic film 3a of the master disk 3, but is selectively magnetized by the leakage flux from the permanent magnet 4 through the surface portion 3b of the substrate, while the embedded magnetic films 3a function as a magnetic contact duplication mask that shields parts of the leakage flux from the permanent magnet 4.

FIG. 12(a) through FIG. 12(e) show a method for manufacturing a master disk 3 having embedded magnetic films 3a.

Figure 12A:
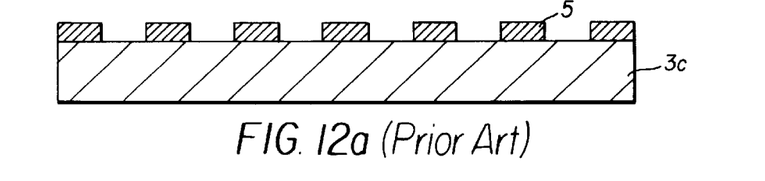
FIG. 12(a) through FIG. 12(d) are cross sectional views showing steps in the method for manufacturing a conventional master disk having embedded magnetic films.
Figure 12B:
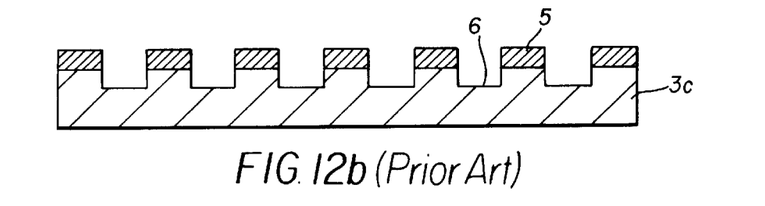
Figure 12C:
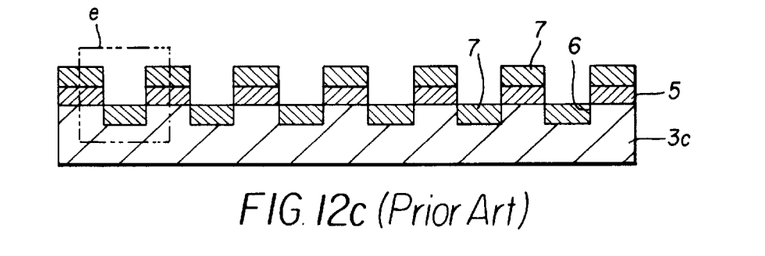
Figure 12D:
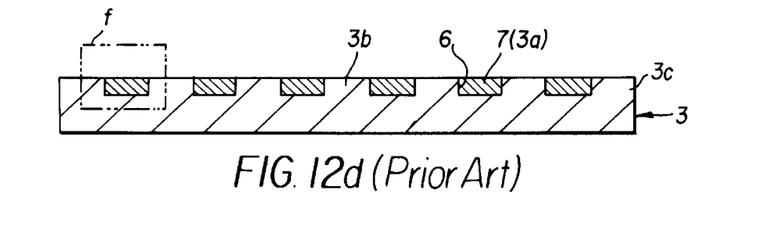
Figure 12E:
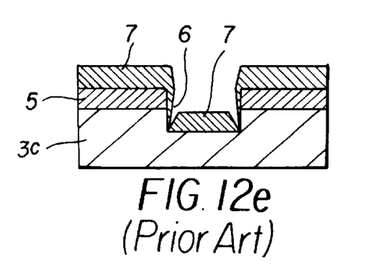
FIG. 12(e) is an enlarged cross sectional view of the part 'e' in FIG. 12(c).

First, photoresist of 1 $\mu$m thick is applied by spin-coating on a silicon substrate 3c of about 500 $\mu$m thick, followed by patterning by means of photolithography commonly used in producing silicon semiconductor devices, to form an etching mask 5, as shown in FIG. 12(a). Then, grooves 6 of depth of about 500 nm are dug by dry-etching the surface of the silicon substrate 3c by means of reactive plasma etching technique using reactive gas of methane trichloride, as shown in FIG. 12(b). Then, Co-based soft-magnetic film 7 of about 500 nm thick is deposited by sputtering on the substrate with the mask 5 left thereon, to form an embedded Co-based soft-magnetic film 7 in the dug groove 6, as shown in FIG. 12(c). Finally, the resultant substrate 3c is dipped in solvent to remove the mask 5 and the Co-based magnetic film 7 thereon, remaining the Co-based soft-magnetic film 7 in the groove 6 as embedded magnetic films 3a. Thus, a master disk 3 with a flat surface having embedded magnetic films 3a is obtained.

The master disk manufactured by the above-described manner, however, involves the following problems.

FIG. 12(c) shows an ideal cross sectional structure in a deposition process of Co-based soft-magnetic film 7, where every sputtered Co particle travels to the bottom surface of the groove 6 of the substrate 3c with incident angle exactly perpendicular to the bottom surface and is not deposited on the inner side-wall of the groove 6 or side-wall of the mask 5. However, because the traveling particles include obliquely incident component as well as perpendicularly incident component, deposition occurs on the inner side-wall of the groove 6 and side-wall of the mask 5, as illustrated in FIG. 12(*e*), which is an enlarged cross section of the portion of FIG. 12(*c*) enclosed by two-dot chain line. Within the groove 6, depositing speed of the incident particles is fast due to shielding effect. Consequently, in the cross-sectional configuration after removing the mask 5 with solvent there are left recesses 8a and protrusions 8b, that are burrs of the pattern edges of the soft magnetic films, as shown in FIG. 12(*f*) which is an enlarged cross section of the portion enclosed by two-dot chain line in FIG. 12(*d*).

Figure 12F:
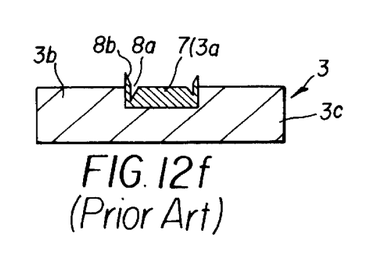
FIG. 12(f) is an enlarged cross sectional view of the part 'f' in FIG. 12(d).

These recesses 8a and protrusions 8b cause various problems. Because the surface of the magnetic recording disk 1 contacts the surface of the master disk 3 or become close proximity with several tens to several hundreds of Å clearance between them in the magnetic contact duplication process, the protrusions 8b cause the magnetic recording disk 1 to be transferred with flaws and gouges in the magnetic contact duplication process. The recesses 8a on the surface of the master disk 3 also cause particles and chemical contaminants to be accumulated at the recesses. Those particles and chemical contaminants may be transferred to the magnetic recording disk 1 in certain probability after a large number of contact duplication operations.

Because the master disk 3 has to be closest to or directly contacted with the magnetic recording disk 1 to enhance accuracy of the magnetic contact duplication, the surfaces of the embedded magnetic films 3a and the silicon substrate 3c deteriorate by wear, for example.

In view of the foregoing, it is an object of the present invention to provide a master magnetic information carrier that has a flat surface free from protrusion and recess while having embedded magnetic film, and a method for manufacturing such a master magnetic information carrier.

It is another object of the invention to provide a master magnetic information carrier that reduces wear due to friction with a magnetic recording medium in a magnetic contact duplication process, a method for manufacturing such a master magnetic information carrier, and a method for manufacturing a magnetic recording medium

SUMMARY OF THE INVENTION

To accomplish the first mentioned object, the present invention features utilization of a resin substrate instead of a silicon substrate. That is, the master magnetic information carrier of the invention comprises embedded magnetic films surrounded by a surface portion of a resin substrate, the surface of the magnetic films being in a common plane with that of the surface portion of the resin substrate. By using the resin substrate, after forming discrete and isolated magnetic films on the substrate, step portions between the magnetic films can be made even with the surface portion of the resin substrate. The embedded magnetic films are surrounded by the surface portion of the resin substrate to obtain a smooth and flat surface and to avoid the protrusion and recess that would appear around each circumference of the embedded magnetic films. As a result, generation of flaws and gouges on the magnetic recording disk and transfer of particles and chemical contaminants to the recording disk in the contact duplication process can be avoided.

Material of the resin surface portion of the resin substrate may be the same as the material of the other portion of the resin substrate. In this case, the density in the resin surface portion is preferably higher than that in the other portion of the resin substrate, which enhances anchoring action with the embedded magnetic film and allows the use of a strong magnet for duplication. Further, the density distribution in the resin surface portion is favorable where the density varies in the surface direction such that the density becomes higher as a position approaches nearer to the side-walls of the embedded magnetic films. Also favorable is the density distribution of the resin surface portion where the density varies in the depth direction such that the density becomes higher as a position approaches nearer to the surface of the resin surface portion. The both density distributions enhance anchoring effect with the embedded magnetic films and durability of the magnetic films.

Material of the resin surface portion may be photo-setting resin. The resin surface portion made of the photo-setting resin may be formed after forming discrete and isolated magnetic films on a resin substrate, by applying fluid photo-setting resin and flattening it, followed by curing. Also in this construction, the embedded magnetic films are surrounded by the resin surface portion of the resin substrate to obtain smooth and flat surfaces and to avoid the protrusion and recess that would appear around each circumference of the embedded magnetic films. As a result, generation of flaws and gouges on the magnetic recording medium and transfer of particles and chemical contaminants to the recording medium in the contact duplication process can be avoided.

Preferably, a reinforcing substrate is laminated on the back surface of the resin substrate. By employing the configuration, warping and deformation of the resin substrate is minimized, and accuracy and durability of magnetic contact duplication can be enhanced.

A master magnetic information carrier of the invention may use a refractory substrate comprising a refractory base plate, such as silicon base plate. In that case, a master magnetic information carrier comprises an embedded magnetic films surrounded by resin surface portion of the refractory substrate, the surfaces of the magnetic films being in a common plane with the surface of the resin surface portion, wherein the material of the resin surface portion of the refractory substrate is thermo-setting resin. Since the refractory base plate is used in the substrate, material of the resin surface portion can be thermo-setting resin. Also in this configuration, the embedded magnetic films are surrounded by the resin surface portion to obtain a smooth and flat surfaces and to avoid protrusions and recesses that would appear around each circumference of the embedded magnetic films.

As a result, generation of flaws and gouges on the magnetic recording medium and transfer of particles and chemical contaminants to the recording medium in the contact duplication process can be avoided.

To accomplish the second object mentioned earlier, the master magnetic information carrier of the invention features provision of a protective film covering the embedded magnetic film. The protective film reduces friction in the magnetic contact duplication process and prolongs life of contact duplication operations.

The protective layer may be a double-layered film. Preferably, the lower layer is a DLC (diamond-like carbon) film and the upper layer is a lubricant film. The configuration remarkably prolongs life of contact duplication. When the protective film is a hydrogen-added DLC film, a film with higher hardness can be deposited than a pure DLC film. When the protective film is a nitrogen-added DLC film, adsorption of corrosive gases, dominant component of which is sulfide, is effectively suppressed.

The present invention further provides a method for manufacturing a master magnetic information carrier having embedded magnetic films surrounded by a resin surface portion of a resin substrate, the surface of the embedded magnetic films being in a common plane with the surface of the resin surface portion, the method comprising the steps of forming discrete and isolated magnetic films in a predetermined region by patterning a continuous magnetic film laminated on a surface of a resin base plate, and pressing the heated resin substrate from above the isolated magnetic films by a die.

According to the manufacturing method, the resin surface portion is formed by a marking or stamping method, in which the surface region within the resin base plate itself is thermoplastically deformed. Therefore, the resin surface portion and the other portion of the resin substrate are in an integrated structure without any boundary in-between. The resin surface portion is denser than the other portion of the substrate because of the pressure molding adapted in the manufacturing method. The resin surface portion exhibits density distribution both in the surface direction or lateral direction and in the depth direction or vertical direction in the resin surface portion, which brings about the strong anchoring effect with the embedded magnetic films, eliminating risk of peeling off of the embedded magnetic films even when the magnetic force of the permanent magnet for magnetic contact duplication is strong.

The manufacturing method of the invention may further comprise a step of coating the surface of the resin substrate with photo-setting resin film between the step of forming isolated magnetic film and the step of pressing the substrate with die, and also comprise a step of irradiating light from the back surface side of the resin substrate before releasing the die utilized in the pressing step. The resin surface portion with reduced strain and initial stress is obtained by the method.

Preferably, the recess portion of the die is adjusted to the position opposite the predetermined region for the magnetic film in the resin substrate and pushed down. In such a process, the protrusion portion of the die first sink into the resin substrate, and then, the recess portion of the die catches the predetermined region within the recess portion of the die and presses the isolated magnetic films into the resin substrate. Consequently, the embedded magnetic films hardly drift relative to each other, and precise positioning of the embedded magnetic film is achieved. In addition, the region formed by the protrusion portion of the die is useful as an air vent groove.

The present invention provides further method for manufacturing a master magnetic information carrier having an embedded magnetic films surrounded by a resin surface portion on a refractory base plate, the surfaces of the embedded magnetic films being in a common plane with the surface of the resin surface portion, the method comprising the steps of forming discrete and isolated magnetic films in a predetermined region by patterning a continuous magnetic film deposited on a surface of the refractory base plate, applying fluid thermosetting resin covering the isolated magnetic films on a refractory base plate, curing the fluid thermosetting setting resin by heating, and etching-back a film of the cured thermo-setting resin until a surfaces of the isolated magnetic films is exposed.

The method proceeds with the sequence of forming the isolated magnetic films, covering the magnetic films with the thermo-setting resin film and curing, and etching-back the resin film. Therefore, the surfaces of the embedded magnetic films and the resin surface portion of the substrate can be made smooth and flat, to obtain a master magnetic information carrier free from protrusion and recess at the boundaries between the magnetic films and the resin surface portion.

The invention further provides a method for manufacturing a magnetic recording medium including a preformatting step performing magnetic contact duplication from a master magnetic information carrier to a magnetic recording medium, wherein contact duplication is conducted with the master magnetic information carrier overlapped together with the magnetic recording medium, and the two articles immersed in liquid of a lubricant or exposed to vapor of a lubricant. Since friction is reduced with the liquid or vapor of the lubricant, prolonged life of contact duplication times is achieved even in a master magnetic information carrier without protective film.

DETAILED DESCRIPTION OF THE PREFERRED EMBODIMENTS OF THE INVENTION

Now, aspects of some preferred embodiments of the invention are described in the following with reference to the accompanying drawings.

First Embodiment

FIG. 1(a) through FIG. 1(e) are cross sectional views showing steps of manufacturing a master disk of the first embodiment of the invention. A resin base plate 10 is prepared having diameter of about 4 inches and thickness of 0.5 to 1 mm, formed of polycarbonate resin or polyolefin resin using a molding machine. A soft-magnetic film 11 of a Co-base alloy or Permalloy having thickness of 500 to 5000 Å is formed by a sputtering method on the surface of the resin base plate.

Then, a photolithography process commonly used in fabricating semiconductor devices is carried out, in which photoresist is applied using spin-coater followed by drying, and then, patterning of a photoresist is performed by exposure through a photomask. The patterned photoresist is used as a mask for patterning like FIG. 1(b) by means of dry or wet etching, to obtain a pattern of discrete and isolated magnetic films 11a which is a structure to become embedded magnetic films. The region occupied by a plurality of isolated magnetic films 11a corresponds to the preformatted region F of a magnetic recording disk. The region between adjacent preformatted regions F, F corresponds to the data region, i.e., unformatted region, of a magnetic recording disk.

Figure 1A:
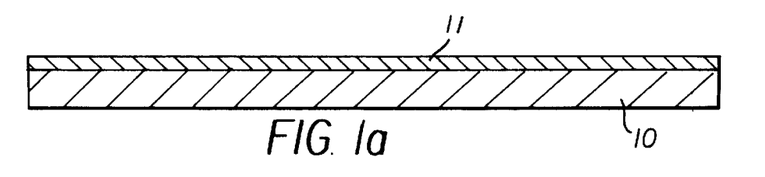
FIG. 1(a) through FIG. 1(e) are cross sectional views showing steps in the method for manufacturing a master disk according to the first embodiment of the invention.
Figure 1B:
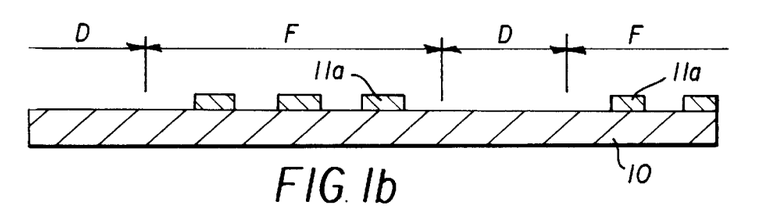
Figure 1C:
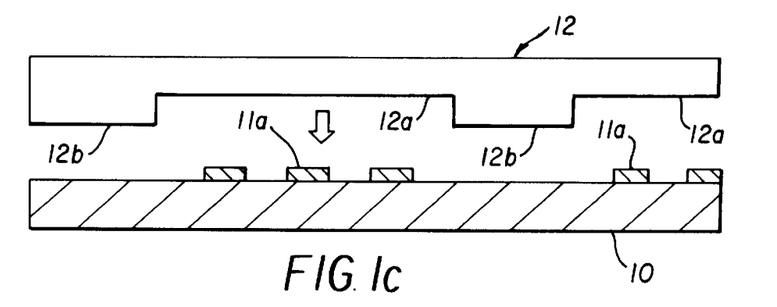

A mold or a die 12 having protrusion portions and recess portions is positioned opposite to the resin base plate with magnetic films thereon, as shown in FIG. 1(c). The die 12 has a recess portion 12a opposite the region bearing the isolated magnetic films and corresponding to a preformatted region F, and a protrusion portion 12b opposite the region corresponding to a data region D. Height of the step between the protrusion portion and the recess portion is larger than the thickness of the isolated magnetic film 11a.

Figure 1D:
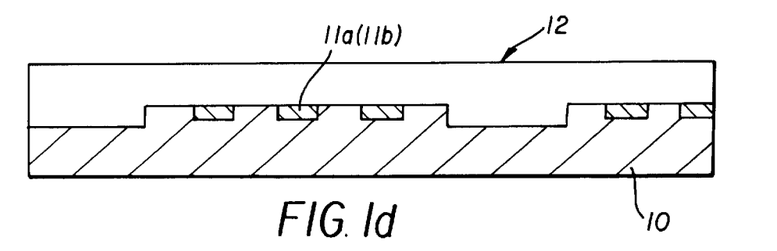

After the positioning, the surface of the resin base plate 10 is pressed by the die 12 heated up to the softening temperature of the resin, as shown in FIG. 1(d). At the beginning of the pressing step, the protrusion portion 12b of the die 12 starts to sink into the surface region of the resin base plate corresponding to the data region D. Subsequently, the recess portion 12a pushes the isolated magnetic films 11a into the resin base plate.

Figure 1E:
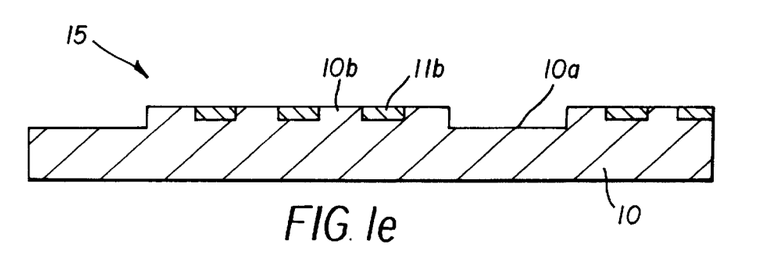

Finally, the die 12 is released, to obtain a master disk 15 shown in FIG. 1(e). The region of the master disk 15 corresponding to data region D provides an air vent groove 10a, useful for attracting a recording disk in a magnetic contact duplication process. The region of the master disk corresponding to preformatted region F forms a trapezoid and comprises embedded magnetic films 11b having surfaces in a common plane with the surface of the resin surface portion 10b. Since the master disk 15 is a mold product made by pressing the die 12 into the thermally softened resin base plate 10, the embedded magnetic films 11b and the surrounding resin surface portion 10b are intimately joined and irregularity at the boundary region is minimized. That is, the surface of the master disk 15 corresponding to the preformatted region F is sufficiently smooth and flat. As a result, generation of flaws and gouges on the magnetic recording medium and transfer of particles and chemical contaminants to the recording medium in the contact duplication process can be avoided.

The resin surface portion 10b is formed by thermoplastically stamping the surface of the resin substrate 10 itself, and therefore, continues to the resin base plate without any boundary. The resin surface portion 10b is denser than the other portion of the substrate. The density within the resin surface portion 10b also varies in surface (lateral) direction such that the density increases as the position approaches the side-walls of the embedded magnetic films 11b. In addition, the density in the resin surface portion 10b exhibits the distribution such that the density increases as the position approaches the surface of the resin surface portion. Thus, the resin surface portion 10b seals the embedded magnetic films 11b with high adhesivity, resulting to fairly strong anchoring effect with the embedded magnetic films 11b. The effect eliminates troubles such as peeling off of the embedded magnetic films even when the magnetic force of a permanent magnet for duplication is strong.

In the die pressing step, the protrusion portion 12b of the die 12 first sink into the portion of the resin base plate corresponding to the data region D, and then the recess portion 12a catches the limited region of the resin base plate corresponding to the preformatted region F and presses the isolated magnetic films 11a into the resin base plate. As a result, the embedded magnetic films 11b are not likely to laterally shift with respect to each other, and precise positioning of the embedded magnetic films is achieved. In addition, the portion formed by the protrusion portion of the die can be used as an air vent groove.

Second Embodiment

Figure 2A:
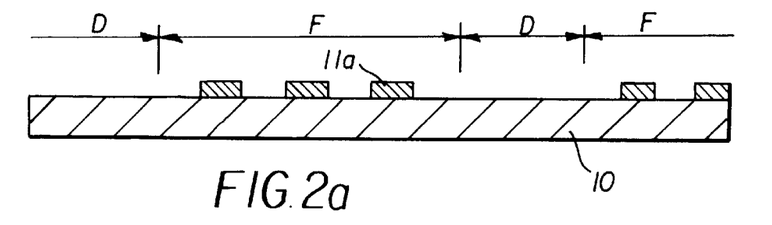
FIG. 2(a) through FIG. 2(d) are cross sectional views showing steps in the method for manufacturing a master disk according to the second embodiment of the invention.
Figure 2B:
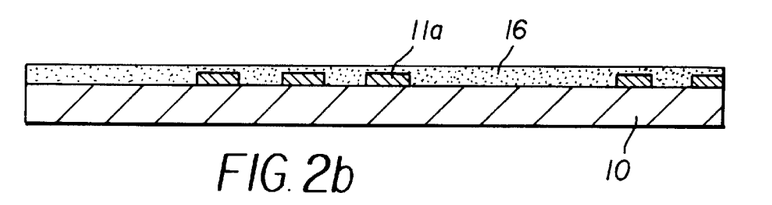

FIG. 2(a) through FIG. 2(e) are cross sectional views showing steps of a method for manufacturing a master disk according to the second embodiment of the invention. Similarly to the first embodiment, discrete and isolated magnetic films 11a are formed on the resin base plate 10, as shown in FIG. 2(a). Subsequently, a photo-setting resin film 16 are formed having a enough thickness to cover the isolated magnetic films by coating using a spin-coater, before a pressing step with the die 12, as shown in FIG. 2(b).

Figure 2C:
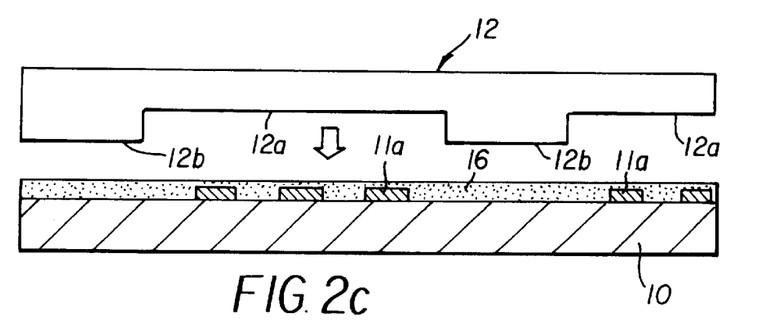

Then, the pressing step using die 12 is conducted. In the step, the die 12 is heated up to the glass transition temperature of the resin base plate 10 similarly to the first aspect of embodiment.

Figure 2D:
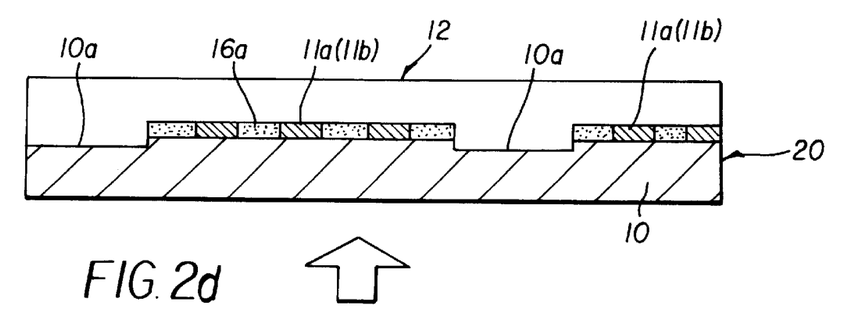

Thereafter, the photo-setting resin film 16 is subjected to ultraviolet light irradiation from the back side of the resin base plate to cure the resin film that has been formerly fluid state, as shown in FIG. 2(d). Finally, the die 12 is released to obtain a master disk 20.

Thus obtained master disk 20 again has an air vent groove 10a in the region corresponding to the data region D formed by the protrusion portion 12b of the die 12. The trapezoid shaped resin region corresponding to the preformatted region F includes embedded magnetic films the surfaces of which have a common plane with the surface of the resin surface portion 16a of the photo-setting resin film. Differently from the first aspect in which the embedded magnetic films 11b are formed by sinking into the resin base plate 10, fluidic photo-setting resin is filled around the isolated magnetic films 11a to obtain a common plane for the magnetic films and the resin surface portion. Consequently, strain and initial stress in the resin surface portion are reduced, providing a durable master disk 20. Because the master disk is a mold product formed by die pressing its surface, the embedded magnetic films 11b and the resin surface portion 16a are intimately adjoined, minimizing protrusions and recesses on the boundary. That is, the surface of the master disk 15 is sufficiently smooth and flat. As a result, generation of flaws and gouges on the magnetic recording medium and transfer of particles and chemical contaminants to the recording medium in the contact duplication process can be reduced.

In the die pressing step, the protrusion portion 12a of the die 12 first sinks into the region of the resin base plate corresponding to the data region D, and then, the recess portion 12b catches the region corresponding to preformatted region F to mold the master disk. As a result, the embedded magnetic films 11b are unlikely to laterally drift relative to each other, and precise positioning of the embedded magnetic films is achieved. Of course, the advantage can be obtained that the portion formed by the protrusion portion of the die can be used as an air vent groove.

Because the ultraviolet light irradiation is performed within the die before releasing the die, strain after cure in the photo-setting resin is minimized, and lateral shift of the embedded magnetic films is suppressed to a minimum.

Third Embodiment

Figure 3A:
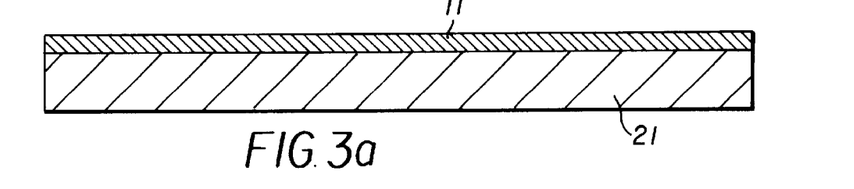
FIG. 3(a) through FIG. 3(f) are cross sectional views showing steps in the method for manufacturing a master disk according to the third embodiment of the invention.
Figure 3B:
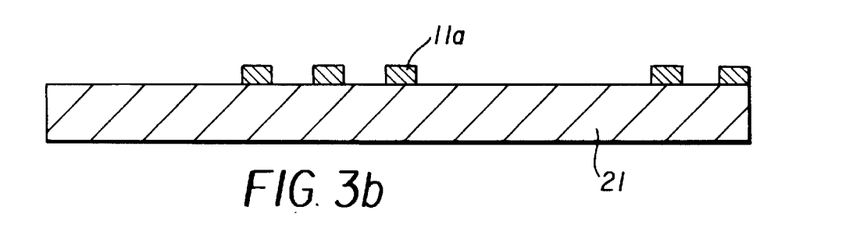

FIG. 3(a) through FIG. 3(e) are cross sectional views showing steps of the manufacturing method of a master disk according to the third embodiment. A silicon base plate with diameter of 4 inches and thickness of about 500 $\mu$m is prepared. Similarly to the first and second aspects of embodiment, a soft-magnetic film 11 is deposited on the silicon base plate as shown in FIG. 3(a), followed by patterning to form discrete and isolated magnetic films 11a, as shown in FIG. 3(b).

Figure 3C:
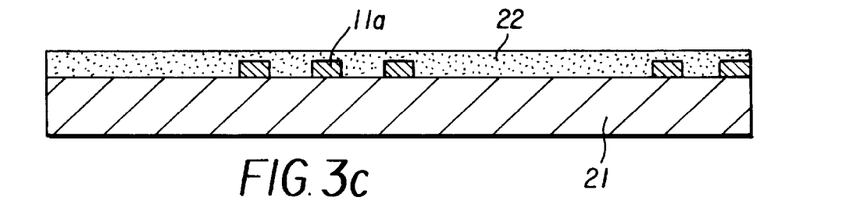

Then, thermo-setting resin, for example, polyimide, is applied on the surface of the silicon base plate 21 by spin coating to a thickness of about twice the thickness of the isolated magnetic film 11a, to form a thermo-setting resin film 22 with fluidity. The thermo-setting resin film 22 covers the isolated magnetic films 11a and the surface of the resin film keeps flat due to surface tension. The thermo-setting resin film 22 is then cured at 200° C. to 300° C. for about 30 minutes.

Figure 3D:
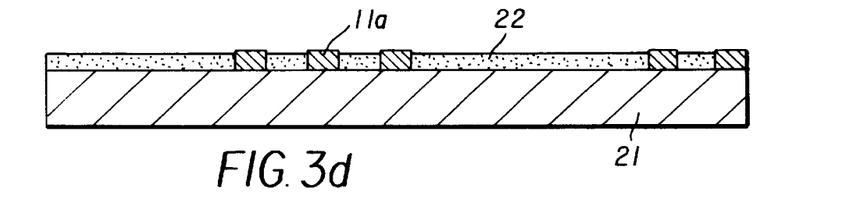

After curing, the resin film 22 covering the isolated magnetic films 11a is subjected to etching-back until the surfaces of the magnetic films 11a are exposed, as shown in FIG. 3(d). The etching-back is performed by exposing the substrate covered by the resin film 22 to reactive plasma using mixed gases of oxygen and argon.

Figure 3E:
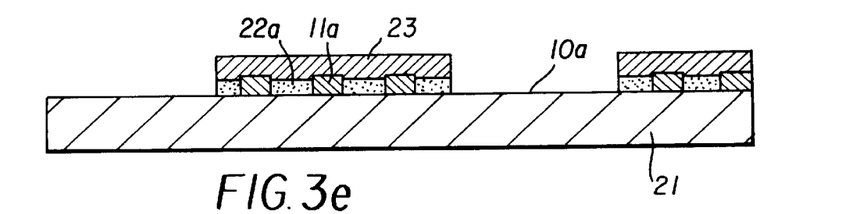
Figure 3F:
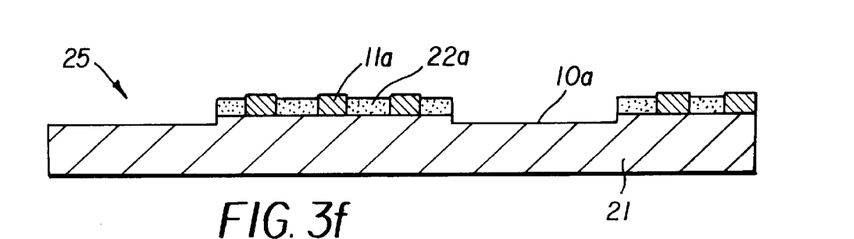

Then, the region containing the magnetic films 11a and corresponding to the preformatted region is covered by photoresist 23 and dry-etched to perform patterning the resin film 22 to form air vent grooves 10a, as shown in FIG. 3(e). Subsequently, the bottom of the air vent groove 10a of the silicon substrate is dug by etching method utilizing the photoresist 23, as shown by FIG. 3(f). Thus, the master disk 25 is obtained.

This aspect of the embodiment is not the case that soft-magnetic film is deposited in a recess in a base plate, but the thermo-setting resin film 22 covering isolated magnetic films 11a deposited on the silicon substrate 21 is etched-back until the surfaces of the isolated magnetic films 11a are exposed. The embedded magnetic films 11a and resin surface portion 22a of the photo-setting resin are intimately adjoined, and the protrusions and recesses are suppressed to a minimum. That is, the surface of the master disk 25 is sufficiently flat. As a result, generation of flaws and gouges on the magnetic recording medium and transfer of particles and chemical contaminants to the recording medium in the contact duplication process can be reduced.

Fourth Embodiment

Figure 4:
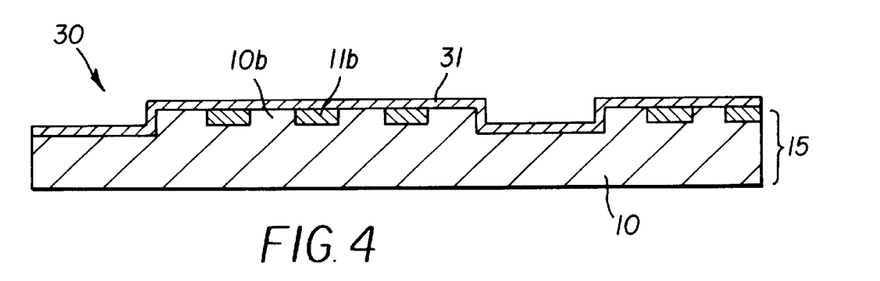
FIG. 4 is a cross sectional view showing a master disk according to the fourth embodiment of the invention.

FIG. 4 shows a cross sectional structure of the master disk of the fourth aspect of embodiment of the invention. This master disk 30 is produced by providing a thin protective film 31 covering a surface of the master disk 15 in the first aspect of embodiment. The protective film 31 may be formed of DLC film, for example. The protective film covers minute protrusions and recesses come about at the boundary between the embedded magnetic films 11b and the resin surface portion 10b, and reduce friction between the master disk and the magnetic recording medium in the contact duplication process. As a result, a master disk capable of enhanced number of operations is obtained. The protective film 31 also suppresses the minute elastic distortion of the trapezoid-shaped resin region containing the embedded magnetic films 11b, which would arise in the contact duplication process.

Fifth Embodiment

Figure 5:
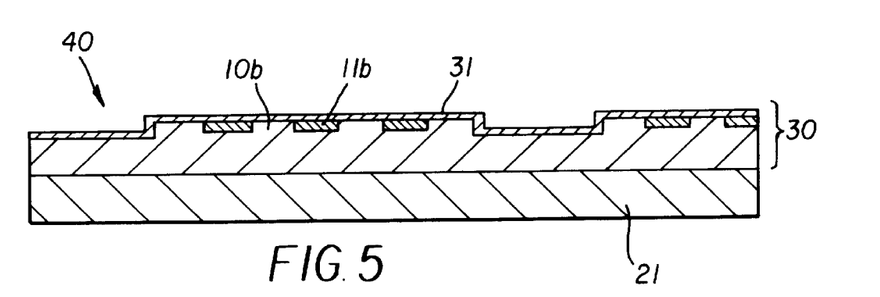
FIG. 5 is a cross sectional view showing a master disk according to the fifth embodiment of the invention.

FIG. 5 shows a cross sectional structure of the master disk in the fifth embodiment of the invention. This master disk 40 consists of a silicon base plate 21 and the master disk 30 shown in FIG. 4 laminated on the silicon base plate. The silicon base plate 21 functions as a reinforcing substrate to prevent distortion and strain of the resin base plate 10. As a result, accuracy of contact duplication and durability of the master disk are enhanced. A method for fabricating the master disk 40 is as follows. A laminated substrate is prepared by applying resin of polyolefin or polycarbonate on a silicon base plate 21 by means of spin-coating, followed by curing. Then, a master disk is fabricated by the similar process to that of the first aspect illustrated in FIG. 1(a) through FIG. 1(e). Finally, a protective film 31 is formed on the resultant master disk to obtain a master disk 40 of the fifth aspect of embodiment.

Sixth Embodiment

Figure 6:
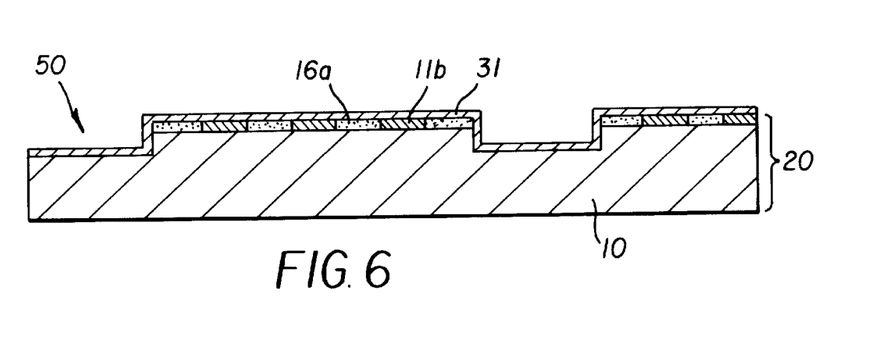
FIG. 6 is a cross sectional view showing a master disk according to the sixth embodiment of the invention.

FIG. 6 shows a cross sectional structure of the sixth embodiment of the invention. This master disk 50 consists of a master disk 20 of the second aspect of embodiment and a thin protective film 31 covering the surface of the master disk 20. The master disk of the sixth aspect exhibits the similar effects to those of the master disk of the fourth aspect. A reinforcing substrate of silicon, for example, may be joined on the back surface of the resin base plate 10.

Seventh Embodiment

Figure 7:
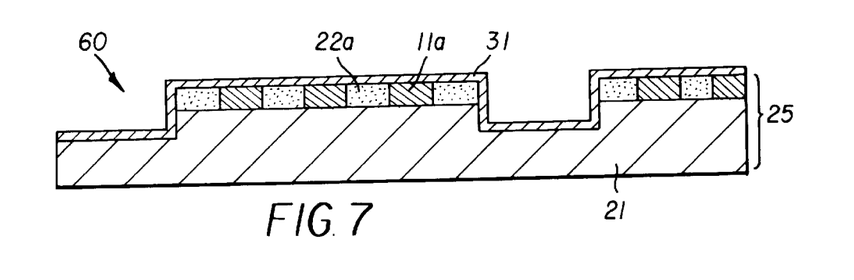
FIG. 7 is a cross sectional view showing a master disk according to the seventh embodiment of the invention.

FIG. 7 shows a cross sectional structure of the seventh embodiment of the invention. This master disk 60 consists of a master disk 25 of the third aspect of embodiment and a thin protective film 31 covering the surface of the master disk 25. The master disk of the seventh aspect exhibits the similar effects to those of the master disk of the fourth aspect of embodiment.

Eighth Embodiment

Figure 8:
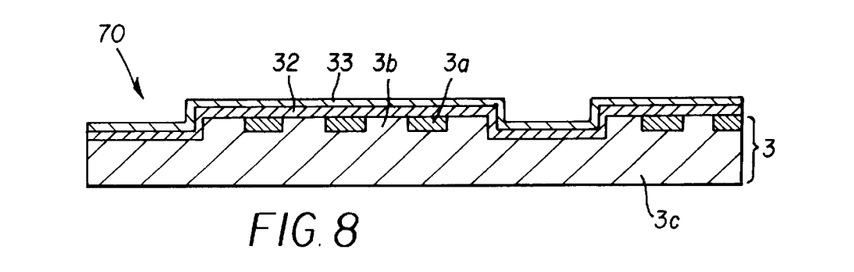
FIG. 8 is a cross sectional view showing a master disk according to the eighth embodiment of the invention.

FIG. 8 shows a cross sectional structure of the eighth embodiment. This master disk 70 consists of a conventional master disk 3 and a double-layered protective film formed on the surface of the conventional master disk 3 shown in FIG. 11(b) or FIG. 12(d).

The first or lower protective film 32 is a carbon film of DLC. The usual methods for depositing the carbon film include the sputtering method and the ECR (Electron Cyclotron Resonance) plasma CVD method. The deposition in the sputtering method utilizes graphite as target material and Ar gas as sputtering gas. When the deposition is conducted adding hydrogen to the Ar gas, a hydrogen-added DLC film results, and when the deposition is conducted adding nitrogen to the Ar gas, a nitrogen-added DLC film results. The deposition in the ECR plasma CVD method is performed by decomposing gaseous hydrocarbon, such as methane, ethane or ethylene, in Ar plasma. When deposition by decomposition of hydrocarbon is conducted in plasma of mixed-gases of Ar and hydrogen, a hydrogen-added DLC film is obtained.

When deposition by decomposition of hydrocarbon is conducted in plasma of mixed-gases of Ar and nitrogen, a nitrogen-added DLC film is obtained. Thickness of the carbon film is determined from trade-off between magnetic contact duplication characteristics, principally intensity of transferring signal, of the embedded magnetic films 3a to a magnetic recording disk on the one hand, and resistance to wear of the protective film on the other hand. In this aspect of embodiment, the thickness is favorably in the range of 50 to 1000 Å. The optimum thickness has to be determined according to the magnetic properties, principally coercive force Hc, of the magnetic film of the magnetic recording disk. Pure DLC film has high electrical conductivity and effectively prevents adhering dust due to electrostatic force. A hydrogen-added DLC film provides a harder film than a pure DLC film. A nitrogen-added DLC film effectively prevents adhesion of corrosive gases, main component of which is sulfide.

The second or upper protective film 33 is a lubricant film. The lubricant film brings about the following advantages. Firstly, friction between a magnetic recording disk and a master disk is substantially reduced. Secondly, when particles and chemical corrosive gases are accumulated on the surface of a master disk 70 after a large number, that is 10 to 100 thousand, of contact duplication operations, the particles and chemical corrosive gases can be removed by washing the lubricant with a solvent, to refresh the surface of the master disk. The lubricant and the solvent to be used in the lubricant film of the master disk may be the organic materials used in a lubricant film of a magnetic recording disk, for example, lubricant: $HO-CH_2-CF_2-(CF_2-O)_m-(C_2F_4-O)_n-CF_2-CH_2-OH$, where each of m and n is an integer, and m+n is about 40;

solvent: $C_nF_{2n+2}$, where n is an integer of from 2 to 4.

The average lifetime of a master disk comprising the carbon protective film 32 and a lubricant film 33 can be prolonged up to the order of several ten millions of contact duplication operations, in average. In a master disk without a carbon protective film 32 after one hundred thousands of contact duplication operations, the defects of cracks and peeling off were observed at the pattern edges of the embedded magnetic films, mainly at protrusions; the defects may be attributed to metal fatigue. In contrast, such defects have been avoided up to several ten millions of operations in average in the master disk having a carbon protective film 32 according to this aspect of embodiment. In a master disk without a lubricant film 33, there was the problem that the accumulation of fine particles and chemical contaminants occurred after several hundred thousands of operations and some of the accumulated substances were transferred to the magnetic recording disk. In contrast, the problem of accumulation of fine particles and chemical contaminants has been avoided in the master disk having a lubricant film 33 by repeating coating of the lubricant film after every one hundred thousands of operations.

The lubricant film 33 may be formed on the surface of the master disk 30, 40, 50 or 60 shown in FIGS. 4, 5, 6 or 7, instead of the conventional master disk 3.

Ninth Embodiment

Figure 9:
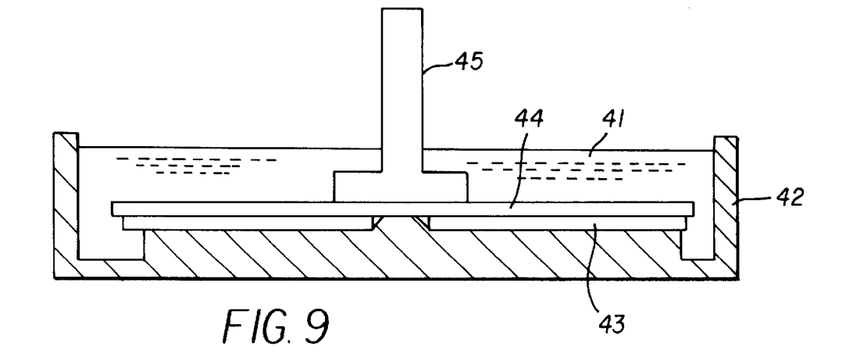
FIG. 9 is a cross sectional view showing the magnetic contact duplication process or preformatting process in the method for manufacturing a magnetic recording disk according to the invention.

FIG. 9 shows a magnetic contact duplication process or a preformatting process in a manufacturing method of a magnetic recording medium according to the invention. In the contact duplication process, the magnetic recording disk 43 and the master disk 44 are joined together and immersed in a vessel filled with lubricating liquid for magnetic contact duplication. A permanent magnet is moved over the master disk 44 as illustrated in FIG. 11(b). The article indicated by reference numeral 45 in FIG. 9 is a master disk holder. The lubricating liquid 41 may be isopropyl alcohol, the solvent $C_nF_{2n+2}$, where n is an integer of from 2 to 4, used in the eighth aspect of embodiment, or a solution of the lubricant $HO-CH_2-CF_2-(CF_2-O)_m-(C_2F_4-O)_n-CF_2-CH_2-OH$, where each of m and n is an integer, and m+n is about 40, used in the eighth aspect of embodiment, dissolved in the solvent $C_nF_{2n+2}$, where n is an integer of from 2 to 4. The lubricating liquid 41 is replaced every ten thousands of operations and at that time, the master disk 44 is ultrasonically washed in the new lubricant.

Since the contact duplication process is performed with the two disks 43 and 44 immersed in the lubricating liquid 41, a master disk 44 without a protective film has exhibited the prolonged life time up to several ten millions of contact duplication operations.

Instead of immersing in a lubricating liquid 41, the disks may be exposed to vapor of the lubricating liquid. The vapor molecules also can exhibit lubricating capability.

As thus far explained, the present invention provides the following effects.

(1) A resin substrate allows the fabrication method in which discrete and isolated magnetic films are formed, and then, the step portion between the magnetic films are filled and made even with a resin surface portion of the resin substrate. By such a fabrication method, the embedded magnetic films are surrounded by the resin surface portion, and the surfaces thereof can be made smooth and flat, suppressing protrusions and recesses in the boundary region. As a result, generation of flaws and gouges on the magnetic recording medium and to transfer of particles and chemical contaminants to the recording medium in the contact duplication process can be prevented.

(2) In the case the material of the resin surface portion is the same material as of the resin base plate of the resin substrate, the resin surface portion having higher density than the other portion of the resin substrate enhances the anchoring effect of the resin surface portion with the embedded magnetic films to allow use of stronger magnet for duplication Preferably, the density in the resin surface portion has a distribution in plane or lateral direction such that the density becomes higher as the position approaches nearer to the side-wall of the embedded magnetic film. In addition, the density in the resin surface portion has a distribution in depth or vertical direction such that the density becomes higher as the position approaches to the surface of the resin surface portion. The both density distributions provide stronger anchoring effect with the embedded magnetic films and enhanced durability of the master disk.

(3) When photo-setting resin is used for the material of the resin surface portion, the surface portion can be formed in the process wherein discrete and isolated magnetic films are first formed, then, fluid photo-setting resin is applied and made even, and then cured. Consequently, excellent surface flatness is achieved.

(4) With a resin substrate, a structure may be employed wherein a reinforcing substrate of silicon, for example, is laminated on the back surface of the resin substrate. The structure minimizes warping and distortion, and provides enhanced contact duplication accuracy and durability.

(5) When a refractory base plate of silicon, for example, is used, a structure may be employed wherein a resin surface portion and magnetic films surrounded by the resin surface portion are provided on the refractory base plate, the surface of the resin surface portion and the surface of the magnetic films being in a common plane, and the material of the resin surface portion is thermo-setting resin. Since the base plate is refractory, thermo-setting resin may be employed for the material of the resin surface portion. The surfaces of the embedded magnetic films and the resin surface portion surrounding the magnetic films can be made smooth and flat, and protrusions and recesses at the boundary region are suppressed.

(6) The structure provided with a protective film covering the embedded magnetic films can reduce friction in a magnetic contact duplication process and prolongs life of contact duplication times.

(7) A double-layered protective film may be employed as a protective film. Preferably, the lower protective film is a DLC film and the upper protective film is a lubricant film formed by coating lubricant on the lower protective film. The configuration provides remarkably prolonged life of contact duplication times. When the DLC film is a hydrogen-added one, the film with higher hardness than a pure DLC film can be deposited. When the DLC film is a nitrogen-added one, the film effectively prevent adsorption of corrosive gases, main component of which is sulfide.

(8) A method for manufacturing a master magnetic information carrier of the invention comprises the steps of forming discrete and isolated magnetic films in predetermined region by patterning a continuous magnetic film laminated on a surface of a resin base plate, and pressing the heated resin substrate from above the isolated magnetic film by a die. According to the manufacturing method, the resin surface portion is formed by a marking or stamping method, in which the surface region within the resin substrate itself is thermoplastically deformed. Therefore, the resin surface portion and the other portion of the resin substrate are in an integrated structure without any boundary in-between. The resin surface portion is denser than the other portion of the substrate because of the pressure molding adapted in the manufacturing method. The resin surface portion exhibits density distribution both in the plane or lateral direction and in the depth or vertical direction within the resin surface portion, which brings about a strong anchoring effect with the embedded magnetic films, eliminating risk of peeling off of the embedded magnetic films even when the magnetic force of the permanent magnet for magnetic contact duplication is strong.

(9) The manufacturing method of the invention may further comprise a step of coating the surface of the resin substrate with photo-setting resin film between the step of forming isolated magnetic film and the step of pressing the substrate with die, and also comprise a step of irradiating light from the back surface side of the resin substrate before releasing the die utilized in the pressing step. The resin surface portion with reduced strain and initial stress is obtained by the method.

(10) Preferably, the recess portion of the die is adjusted to the position opposite the predetermined region for the magnetic films in the resin substrate and pushed down. In such a process, the protrusion portion of the die first sink into the resin substrate, and then, the recess portion of the die catches the predetermined region within the recess portion of the die and presses the isolated magnetic film into the resin substrate. Consequently, the embedded magnetic films hardly drift relative to each other, and precise positioning of the embedded magnetic film is achieved. In addition, the portion formed by the protrusion of the die is useful as an air vent groove.

(11) Another method for manufacturing a master magnetic information carrier of the invention comprises steps of forming discrete and isolated magnetic films in a predetermined region by patterning a continuous magnetic film deposited on a surface of the refractory base plate, applying fluid thermosetting resin covering the isolated magnetic films on the refractory base plate, curing the fluid thermo-setting resin by heating, and etching-back a film of the cured thermo-setting resin until surfaces of the isolated magnetic films are exposed. Since the embedded magnetic films is exposed by etching-back, the surfaces of the embedded magnetic films and the resin surface portion of the substrate can be made smooth and flat, to obtain a master magnetic information carrier free from protrusion and recess at the boundary between the magnetic films and the resin surface portion.

(12) The invention further provides a method for manufacturing a magnetic recording medium including a preformatting step performing magnetic contact duplication from a master magnetic information carrier to a magnetic recording medium, wherein contact duplication is conducted with the master magnetic information carrier overlapped on the magnetic recording medium, and the two articles immersed in liquid of a lubricant or exposed to vapor of a lubricant. Since friction is reduced with the liquid or vapor of the lubricant, prolonged life of contact duplication times is achieved even in a master magnetic information carrier without a protective film.

What is claimed is:

1. A master magnetic information carrier comprising:
    a substrate including a resin base plate and a resin surface portion formed on said resin base plate; and
    discrete and isolated embedded magnetic films formed on said resin base plate and surrounded by said resin surface portion,
    wherein the surfaces of said embedded magnetic films and the surface of said resin surface portion are in a common plane, and
    wherein the density of said resin surface portion is higher than the density of said resin base plate.

2. A master magnetic information carrier according to claim 1, wherein material of said resin surface portion is the same as material of said resin base plate.

3. A master magnetic information carrier according to claim 1, wherein said resin surface portion exhibits such density distribution in a surface direction that the density is higher as a position approaches nearer to the side surface of said embedded magnetic films.

4. A master magnetic information carrier according to claim 1, wherein said resin surface portion exhibits such density distribution in a depth direction that the density is higher as a position approaches nearer to the surface of said resin surface portion.

5. A master magnetic information carrier according to claim 1, wherein material of said resin surface portion is a photo-setting resin.

6. A master magnetic information carrier according to claim 1 further comprising a reinforcing substrate laminated on the back surface of said resin base plate.

7. A master magnetic information carrier according to claim 1 further comprising a protective film covering said embedded magnetic films.

8. A master magnetic information carrier comprising:

a substrate including a refractory base plate and a resin surface portion formed on said refractory base plate; and discrete and isolated embedded magnetic films formed on said refractory base plate and surrounded by said resin surface portion, wherein the surfaces of said embedded magnetic films and the surface of said resin surface portion are in a common plane, wherein the material of said resin surface portion is a thermo-setting resin, and wherein the density of said resin surface portion is higher than the density of said resin base plate.

9. A master magnetic information carrier according to claim 8 further comprising a protective film covering said embedded magnetic films.

10. A master magnetic information carrier comprising:

a substrate including a base plate and a surface portion of said substrate on said base plate;

discrete and isolated embedded magnetic films formed on said base plate and surrounded by said surface portion; and a double-layered protective film covering said embedded magnetic films, wherein the surfaces of said embedded magnetic films and the surface of said surface portion are in a common plane, and wherein the density of said resin surface portion is higher than the density of said resin base plate.

11. A master magnetic information carrier according to claim 10, wherein said double-layered protective film comprises a lower protective film and an upper protective film, said lower protective film being a diamond like carbon film and said upper protective film is a lubricant film formed by applying lubricant.

12. A master magnetic information carrier according to claim 11, wherein said diamond like carbon film is a hydrogen-added film.

13. A master magnetic information carrier according to claim 11, wherein said diamond like carbon film is a nitrogen-added film.

14. A method for manufacturing a master magnetic information carrier comprising a substrate including a resin base plate and a resin surface portion formed on said resin base plate, and embedded magnetic films formed on said resin base plate and surrounded by said resin surface portion, wherein the surfaces of said embedded magnetic films and the surface of said resin surface portion are in a common plane, and wherein the density of said resin surface portion is higher than the density of said resin base plate, the method comprising steps of:

forming discrete and isolated magnetic films in a predetermined region by patterning a continuous magnetic film deposited on the surface of said resin base plate; and pressing said resin base plate at elevated temperature from above said isolated magnetic films by a die.

15. A method for manufacturing a master magnetic information carrier according to claim 14 further comprising steps of:

applying photo-setting resin on the surface of said resin base plate having said isolated magnetic films thereon after said step of forming isolated magnetic films and before said step of pressing; and irradiating light from the back surface of said resin base plate before releasing the die used in said pressing step.

16. A method for manufacturing a master magnetic information carrier according to claim 15, wherein said pressing step is conducted with a recess portion of said die positioned opposite said predetermined region.

17. A method for manufacturing a master magnetic information carrier according to claim 14, wherein said pressing step is conducted with a recess portion of said die positioned opposite said predetermined region.

18. A method for manufacturing a master magnetic information carrier comprising a substrate including a refractory base plate and a resin surface portion formed on said refractory base plate, and embedded magnetic films formed on said refractory base plate and surrounded by said resin surface portion, wherein the surfaces of said embedded magnetic films and the surface of said resin surface portion are in a common plane, wherein the material of said resin surface portion is a thermo-setting resin, and wherein the density of said resin surface portion is higher than the density of said resin base plate, the method comprising steps of:

forming discrete and isolated magnetic films in a predetermined region by patterning a continuous magnetic film deposited on the surface of said refractory base plate;

applying fluid thermo-setting resin covering said isolated magnetic films on said refractory base plate having said isolated magnetic films thereon;

curing said fluid thermo-setting resin by heating; and etching-back the cured thermo-setting resin until the surfaces of said isolated magnetic films expose.

* * * * *